US011681931B2

United States Patent
Zhang et al.

(10) Patent No.: US 11,681,931 B2
(45) Date of Patent: Jun. 20, 2023

(54) METHODS FOR AUTOMATICALLY CONFIGURING PERFORMANCE EVALUATION SCHEMES FOR MACHINE LEARNING ALGORITHMS

(71) Applicant: International Business Machines Corporation, Armonk, NY (US)

(72) Inventors: Bo Zhang, Hoboken, NJ (US); Gregory Bramble, Larchmont, NY (US); Parikshit Ram, Atlanta, GA (US); Horst Cornelius Samulowitz, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 890 days.

(21) Appl. No.: 16/580,953

(22) Filed: Sep. 24, 2019

(65) Prior Publication Data
US 2021/0089937 A1 Mar. 25, 2021

(51) Int. Cl.
*G06N 5/04* (2023.01)
*G06N 20/00* (2019.01)

(52) U.S. Cl.
CPC .............. *G06N 5/04* (2013.01); *G06N 20/00* (2019.01)

(58) Field of Classification Search
CPC ........... G06N 5/04; G06N 20/00; G06N 5/003
See application file for complete search history.

(56) References Cited

U.S. PATENT DOCUMENTS 8,494,806 B2  7/2013  Kato et al.
2010/0268511 A1  10/2010  Kato et al.
(Continued)

FOREIGN PATENT DOCUMENTS

WO  2015184729  12/2015

OTHER PUBLICATIONS

James Bergstra and Yoshua Bengio. 2012. Random search for hyper-parameter optimization. J. Mach. Learn. Res. 13, null (Mar. 1, 2012), 281-305. (Year: 2012).*
(Continued)

*Primary Examiner* — Ann J Lo
*Assistant Examiner* — Van C Mang
(74) *Attorney, Agent, or Firm* — Amin, Turocy & Watson, LLP

(57) ABSTRACT

A system that provides a mathematical formulation for new problem of model validation and model selection in presence of test data feedback. The system comprises a memory that stores computer-executable components. A processor, operably coupled to the memory, executes the computer-executable components stored in the memory. A selection component selects a metric of performance evaluation accuracy; and a configuration component configures performance evaluation schemes for machine learning algorithms. A characterization component employs a supervised learning-based approach to characterize relationship between the configuration of the performance evaluation scheme and fidelity of performance estimates; and an optimization component that optimizes accuracy of the machine learning algorithms as a function of size of training data set relative to size of validation data set through selection of values associated with the configuration parameters.

20 Claims, 8 Drawing Sheets

(56) References Cited

U.S. PATENT DOCUMENTS

| | | | |
|---|---|---|---|
| 2016/0344770 A1* | 11/2016 | Verma | H04L 51/42 |
| 2016/0358099 A1 | 12/2016 | Sturlaugson et al. | |
| 2018/0018587 A1 | 1/2018 | Kobayashi et al. | |
| 2018/0082212 A1 | 3/2018 | Faivishevsky et al. | |
| 2020/0090075 A1* | 3/2020 | Achin | G06Q 30/0201 |
| 2020/0134489 A1* | 4/2020 | Achin | G06Q 10/06 |

OTHER PUBLICATIONS

Raschka, S. (2018). Model evaluation, model selection, and algorithm selection in machine learning. arXiv preprint arXiv: 1811.12808. (Year: 2018).*

Chien-Ming Huang, "Model selection for support vector machines via uniform design", 2007 (Year: 2007).*

Snoek et al., "Practical Bayesian Optimization of Machine Learning Algorithms." Advances in Neural Information Processing Systems 25: 2960-2968 (2012).

"Optimal model validation and selection with test data feedback" Association for the Advancement of Artificial Intelligence. (2019).

* cited by examiner

METHODS FOR AUTOMATICALLY CONFIGURING PERFORMANCE EVALUATION SCHEMES FOR MACHINE LEARNING ALGORITHMS

TECHNICAL FIELD

The subject disclosure relates generally to a system and method that provides a mathematical formulation for model validation and model selection in presence of test data feedback.

SUMMARY

The following presents a summary to provide a basic understanding of one or more embodiments of the invention. This summary is not intended to identify key or critical elements, delineate scope of particular embodiments or scope of claims. Its sole purpose is to present concepts in a simplified form as a prelude to the more detailed description that is presented later. In one or more embodiments described herein, systems, computer-implemented methods, apparatus and/or computer program products that facilitates automatic configuration of performance evaluation schemes for machine learning algorithms.

In accordance with an embodiment, a system comprises a memory that stores computer-executable components; a processor, operably coupled to the memory, executes the computer-executable components stored in the memory, wherein the computer-executable components comprise a selection component that selects a metric of performance evaluation accuracy; a configuration component that configures performance evaluation schemes for machine learning algorithms; a characterization component that employs a supervised learning-based approach to characterize the relationship between the configuration of the performance evaluation scheme and respective configuration fidelity of performance estimates; and an optimization component that optimizes accuracy of the machine learning algorithms as a function of size of training data set relative to size of validation data set through selection of values associated with the configuration parameters.

DETAILED DESCRIPTION

Figure 1:
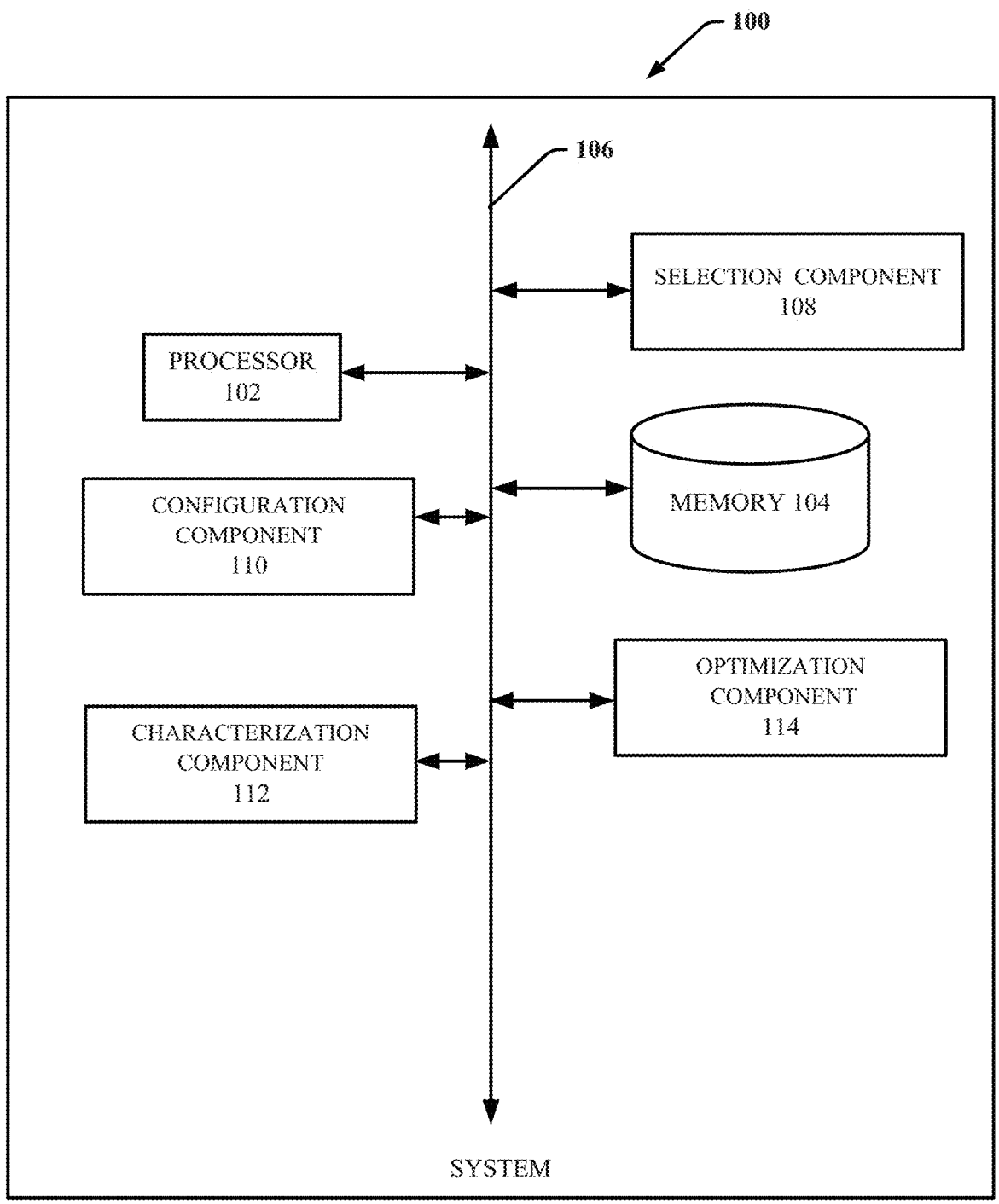
FIG. 1 illustrates a block diagram of an example system that can automatically configure a performance evaluation scheme and produce optimal model validation results in accordance with an implementation.

The following detailed description is merely illustrative and is not intended to limit embodiments and/or application or uses of embodiments. Furthermore, there is no intention to be bound by any expressed or implied information presented in the preceding Summary section, or in the Detailed Description section. One or more embodiments are now described with reference to the drawings, wherein like reference numerals are used to refer to like elements throughout. In the following description, for purposes of explanation, numerous specific details are set forth in order to provide a more thorough understanding of the one or more embodiments. It is evident; however, in various cases, that the one or more embodiments can be practiced without these specific details.

In today's digital world, data plays a prime factor in many applications. Action(s) taken by a user can often leave a digital footprint through satellite images, bio-medical field, smartphones, social media and other applications. Rapidly growing technology has led to exponential increase of machine-generated data. Big Data represents a new era in data exploration and utilization such that it consists of data that is high in volume, variety and velocity. Modern advances in software engineering have led to deploying software as services (known as SaaS), which provides a significant advantage for organizations to focus on core businesses instead of expanding resources on computer infrastructure and maintenance. For example, 'big-data' software as a service, which takes a set of data instances as input, performs computations for data clustering and returns partitioning of the data to a client as an output. Big data can be used in many scenarios for data mining such as, to track user generated content in social media, analyze web page images from the web and census data, obtain required data from Internet of Things (IoT) sensors, activity tracking from smartphones and network traffic data for cyber-security. Machine learning has become an integral part of the big data world.

A machine learning algorithm is a process that adapts a model to data with an objective. An algorithm generally specifies a method in which data is transformed from input to output and also can learn appropriate mapping from input and output values. Thus, a machine learning algorithm is a combination of model chosen and type of algorithm chosen. A model is further detailed with specifications of mapping functions and stores the parameter data while continuing to learn the algorithm updates thus satisfying an overall objective. Machine learning has attracted increasing attention from commercial entities and researches. Existing approaches primarily focus on tackling hard computational issues of effectively determining suitable combinations of analytic algorithms. For example, such as feature engineering, selection and tuning hyperparameters. New emerging technologies enhance machine learning algorithms from pattern recognition to performing specific tasks. Machine learning becomes a significant iterative aspect in a digital world as models are exposed to new data; the models are able to adapt independently as well. Thus, the concept of learning from previous computations and an ability to produce reliable decisions gains fresh momentum. Recent studies have shown that many machine learning systems have an ability to automatically apply complex mathematical calculations to big data at rapid rate. Some examples of machine learning applications are self-driving cars, online recommendation offers from stores and detection of unauthorized activity. Most industries that work with substantial data recognize importance of machine learning technology.

A useful aspect of creating a superlative machine learning system is that, a system can ensure use of data preparation capabilities, algorithms, automation or iterative process, scalability and ensemble modeling. An algorithm can be used to build models which can reveal various connections and thus lead to faster decision making without human intervention. Organizations are able to deliver quality product and work efficiently to keep up with competitors by deriving insights of real time substantial data.

Financial industries such as banks use machine learning technology to identity useful insights in data that can help to identify investment opportunities and prevent unauthorized activity by using cybersurveillance to recognize warning signs of unauthorized activity. Healthcare industry use machine learning systems to assess a patient's health in real time through an advent of wearable devices and sensors. Also, health care technology can assist medical experts to analyze data and identify any red flags that could ultimately improve diagnosis and treatment. In retail industry, machine learning systems analyze consumer purchase history and recommend items accordingly. Machine learning systems capture data, analyze it and implement marketing strategies, price optimization and merchandise supply planning. Another industry such as transportation industry identifies traffic patterns and make routes more efficient causing lesser traffic jams.

As data grows in volume and variety, computational processing that is powerful and affordable is of growing importance as well. Through machine learning systems, data can automatically produce models to analyze complex data and deliver accurate analytical results. This would ultimately assist many organizations to identify profitable opportunities while avoiding unknown risks. Machine learning systems learn, adapt outcomes and new patterns that are recognized and can be achieved by supervised or unsupervised learning algorithms Though there are many machine learning methods, supervised and unsupervised learning methods are most widely adopted. Many machines use supervised learning algorithms that process input and output values and use such algorithms to map input and output values accordingly. Unsupervised algorithms have a set of input values and no corresponding output values and an objective of unsupervised learning is to understand an algorithm and ultimately compute a structure to data.

In supervised learning algorithms, an input variable is trained on the dataset to find the connection between the input variables and output such that a desired output is known. Supervised learning methods use patterns to predict values of variables on unlabeled data through methods like classification and regression, prediction and gradient boosting. A supervised learning method is adopted in various applications such as historical data prediction when credit card transactions are to be unauthorized. Some common supervised learning methods include logistic regression, neural networks, decision trees, gradient boastingboosting machines, and support vector machines. In unsupervised learning, there are no historical insights about data; it explores the data, designs a structure that describes underlying framework and dimensions of the data. These types of learning methods help to identify transactional data such as for example, a system can identify segments of customers with similar attributes and aim for marketing strategies for unique focus group. In theory, a machine learning algorithm automates extraction of known and unknown data patterns and articulates patterns through form of a formula, or an instruction set which can be applied to new or unseen data. Some common unsupervised machine learning methods include self-organizing maps, k-means, dbscan, kernel density estimates and one-class support vector machines. Through recent advances in technology, machine learning has increased interest to adopt these algorithms for substantial and complex data. However, incorporating modern machine learning techniques into production data infrastructures is challenging. Hence, evaluation of machine learning models is a growing endeavor.

In recent years, automating machine learning and data science has attracted increasing attention from commercial entities and researchers. Existing approaches primarily focus on tackling hard computational issue of effectively determining a suitable combination of analytic algorithms such as feature engineering and selection, predictive modeling and tuning hyperparameters to serve as an automatically generated workflow. In this process, while training a model is a useful aspect, it is equally significant to consider how a model generalizes to unseen data. There might be gaps to be considered in this process wherein verifications are to be made whether an algorithm merely memorizes received data and therefore not able to make accurate predictions. Hence, it is significant to evaluate how well a machine learning model generalizes to new and unseen data.

In most any data science project, evaluating performance of a machine learning model plays as an integral component. There are various evaluation techniques that aim to estimate generalization accuracy of a model on data points and two such common methods widely used are Holdout and Cross-Validation. Both methods use a test set such that data is not seen by a model to evaluate model performance. Some common evaluation strategies are to either perform a simple Holdout validation with a constant ad-hoc Holdout fraction (e.g., ⅓) or undergo a k-fold for some fixed constant valued k (e.g., 10). However, the technique to determine if a particular algorithm (or sequence of algorithms) is best among explored candidates receives relatively less attention.

Embodiments address an issue of automatically configuring such performance evaluation schemes (such as Holdout, k-fold) wherein Holdout percentage number suited for a given data set and algorithm instances of interest are determined. It is useful to understand that to select a correct algorithm for a particular model and produce accurate validation results, is equally significant.

FIG. 1 illustrates a block diagram of an example system 100 that can access data and process that data using variable computing components depicted in accordance with one or more embodiments described herein. The system 100 can facilitate a process of assessing and identifying a substantial amount of various forms of data, and using machine learning, training a neural network or other type of model. The system 100 can also generate predictive recommendations to an individual level resulting in a context in accordance with one or more embodiments described herein. Aspects of systems (e.g., system 100 and the like), apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. Repetitive description of like elements employed in one or more embodiments described herein is omitted for sake of brevity.

System 100 can optionally include a server device, one or more networks and one or more devices (not shown). The system 100 can also include or otherwise be associated with at least one processor 102 that executes computer executable components stored in memory 104. The system 100 can further include a system bus 106 that can couple various components including, but not limited to, a selecting component 108 that selects an appropriate metric of performance evaluation accuracy, a configuring component 110 that configures performance evaluation schemes for machine learning algorithms, a characterization component 112 that employs a supervised learning-based approach to characterize relationship between performance evaluation schemes and respective configuration parameters and an optimization component 114 that optimizes accuracy of a machine learning algorithm as a function of size of training data set relative to size of validation data set through selection of values associated with configuration parameters. These components and their respective functions are explained in detail throughout the document in the various sections below.

The system 100 can be any suitable computing device or set of computing devices that can be communicatively coupled to devices, non-limiting examples of which can include, but are not limited to, a server computer, a computer, a mobile computer, a mainframe computer, an automated testing system, a network storage device, a communication device, a web server device, a network switching device, a network routing device, a gateway device, a network hub device, a network bridge device, a control system, or any other suitable computing device. A device can be any device that can communicate information with the system 100 and/or any other suitable device that can employ information provided by system 100. It is to be appreciated that system 100, components, models or devices can be equipped with communication components (not shown) that enable communication between the system, components, models, devices, etc. over one or more networks.

In accordance with the system 100, memory 104 can store computer executable components executable by the processor 102. The various components of system 100 can be connected either directly or via one or more networks. Such networks can include wired and wireless networks, including, but not limited to, a cellular network, a wide area network (WAN) (e.g., the Internet), or a local area network (LAN), non-limiting examples of which include cellular, WAN, wireless fidelity (Wi-Fi), Wi-Max, WLAN, radio communication, microwave communication, satellite communication, optical communication, sonic communication, or any other suitable communication technology. Moreover, the aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components can be combined into a single component providing aggregate functionality. The components can also interact with one or more other components not specifically described herein for the sake of brevity, but known by those of skill in the art.

A need for machine learning algorithm(s) to articulate accurate results by striving through substantial data content and being able to output results is one of the biggest assets for any organization. Similarly, there is always a necessity to validate stability of a machine learning model. There would be a requirement for some kind of assurance that a model has captured most patterns from a given data points and leaves out any unwanted noise so that results are not biased. Hence, one core task in building a machine learning model is to evaluate performance. There are multiple stages in developing a machine learning model in any application. Thus, these embodiments produce a computer program product for automatically calculating performance evaluation scheme parameters under an input of (1) a given data set; (2) a set of machine learning algorithms; and (3) chosen performance evaluation method. In the current state of the art, machine learning method(s) are used widely with various configuration methods. In order to measure performance of these configurations, many schemes such as Holdout validation and k-fold are used. One aspect of these embodiments is to evaluate machine learning method configuration and identify best method(s) to configure a scheme in order to achieve accurate and optimized results. As there are various benchmarks for machine learning methods, an automatic configuration system can assign appropriate metrics to parameters and select appropriate size of data set(s) for valid configuration of schemes.

Embodiments herein can be described two-fold such that: (1) connect accuracy of performance evaluation scheme(s) to configuration; and (2) explicitly characterize accuracy of performance evaluation scheme(s). Thus, providing ability to find configuration(s) with highest expected accuracy. Selection component 108 selects a metric of performance evaluation accuracy. Embodiments promote an automated machine learning system which can process procedures that can mathematically guide choice of model validation and selection. An effective validation and selection strategy become significant in determining true performance of a machine learning system. As machine learning becomes ever ubiquitous, increased consequential decisions will be based on output of these models. A very small precision difference can translate to significant impact and therefore performance evaluation scheme configuration clearly matters. These embodiments can improve large-scale model selection (hyper-parameter tuning) needed for various machine learning applications. Configuring performance evaluation scheme(s) in a data and model dependent manner provide better estimate of generalization error; this can allow a model to make better (or at least better informed) model selection decisions, leading to models with improved performance on unseen data.

In these embodiments tradeoffs involve selecting a 'best' model based on test set of validation errors reported (via a data metrics report). Embodiments focus on a scenario in which a substantial number of models in some model space of interest H have been validated, for example, $\{h_n, n=1, \ldots, N\} \in H$ with N being a very substantial number and $h_n$ is drawn from a distribution DH over space H. Let:

$$M_N := \min\{\hat{\epsilon}_S(\bar{h}_n), n = 1, \ldots, N\}$$

$$M_N := \min\{\hat{\epsilon}_S(\bar{h}_n), n = 1, \ldots, N\}$$

It follows that, for large N:

$$Pr[M_N \geq u_N] \approx e^{-\tau}, Pr[M_N \geq u_N] \approx e^{-\tau},$$

Where:

$$Pr_{h \in D_H}[\hat{\epsilon}_S(h) \leq u_N] \approx \tau/N \; Pr_{h \in D_H}[\hat{\epsilon}_S(h) \leq u_N] \approx \tau/N$$

e.g., $u_N$ is a lower $\tau/N$ fraction cutting point of possible test set validation errors. If a model with lowest test set validation error is selected, this selected model's validation error falls outside a bottom $\tau/N$ fraction of possible validation error values with probability $e^{-\tau}$. Since it is often true that models with lowest validation error on a particular test data set tends to not have lowest generalization error, or generalization error as a function of a validation error tends to be unimodal, these embodiments suggest selecting a model around an appropriate $\tau^*/N$ lower fraction level of possible test set validation errors, thus attempting to achieve best generalization error. A choice of an appropriate $\tau^*$ depends on how likely overfit occurs, e.g., if an overfit alert region as indicated by $t_{0.05}(m, \in\Delta, \beta)$ is wide or not. Embodiments promote determining $\tau^*$ based on characteristics of a learning task; e.g., greater $t_{0.05}(m, \in\Delta, \beta)$ value, then larger value of $\tau^*$ can be used.

Configuration component 110, configures performance evaluation schemes for machine learning algorithms. In order to configure parameters in any schemes, evaluation strategies such as a simple Holdout validation need to be considered first. Holdout fraction or undergo a k-fold cross validation for some fixed constant valued k. Typically in a model selection process, focus is on automatic exploration of a model hyper-parameter space (or multiple models) with an adequate generalization performance A current standard learning theory implies that success of a particular configuration of performance evaluation scheme in estimating generalization performance depends on the complexity of a model being evaluated and the complexity of data/issue at hand. However, performance evaluation scheme, which is used to estimate generalization performance of any model, usually has ad hoc (model & data independent) configuration. Thus, these embodiments depict an explicit dependence between data, model and configuration of performance evaluation scheme and allows to configure performance evaluation schemes in a model and data dependent manner.

Figure 2:
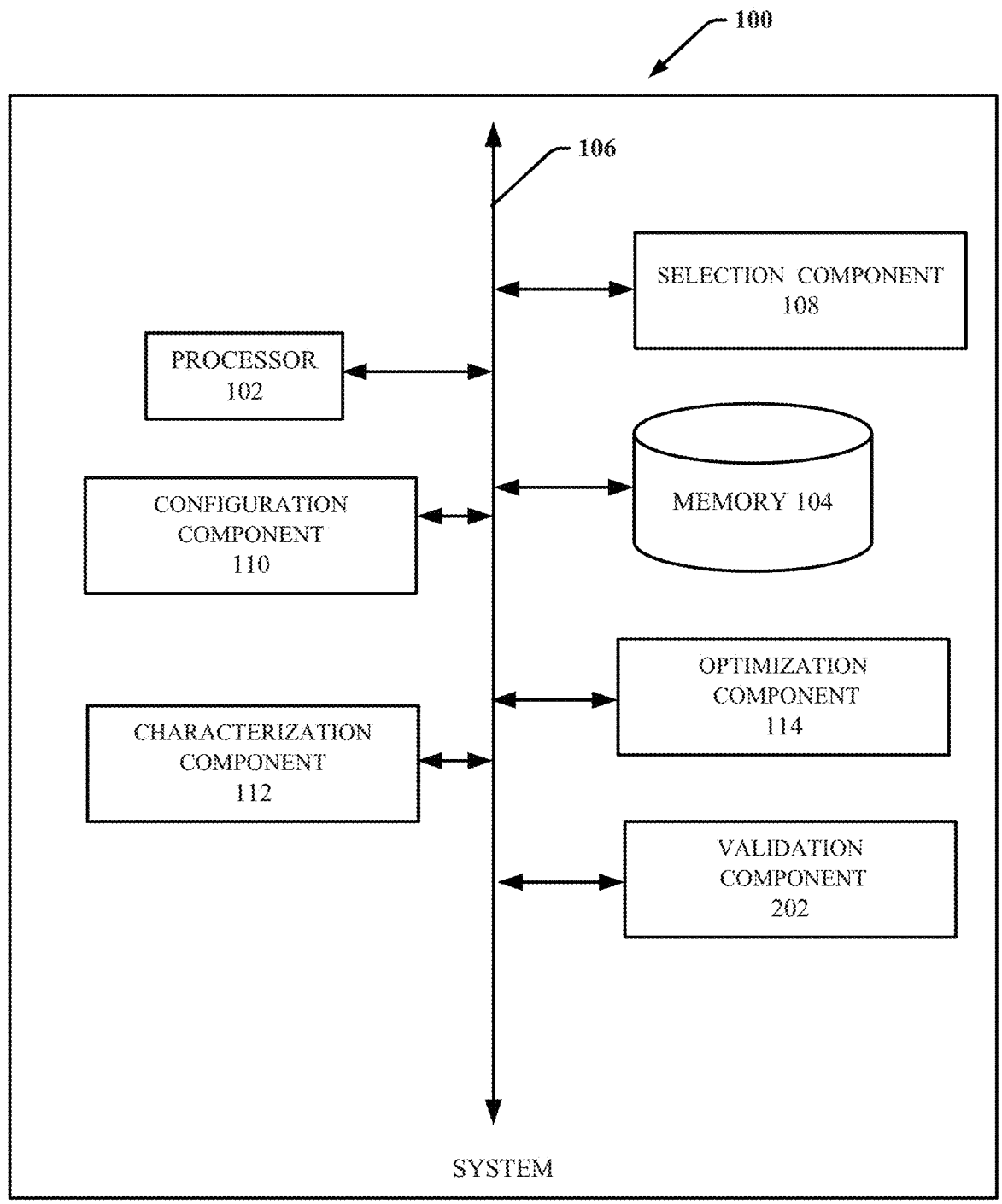
FIG. 2 illustrates a block diagram of an example system that can automatically configure a performance evaluation scheme and produce optimal model validation results using a validation component in accordance with an implementation.
Figure 3:
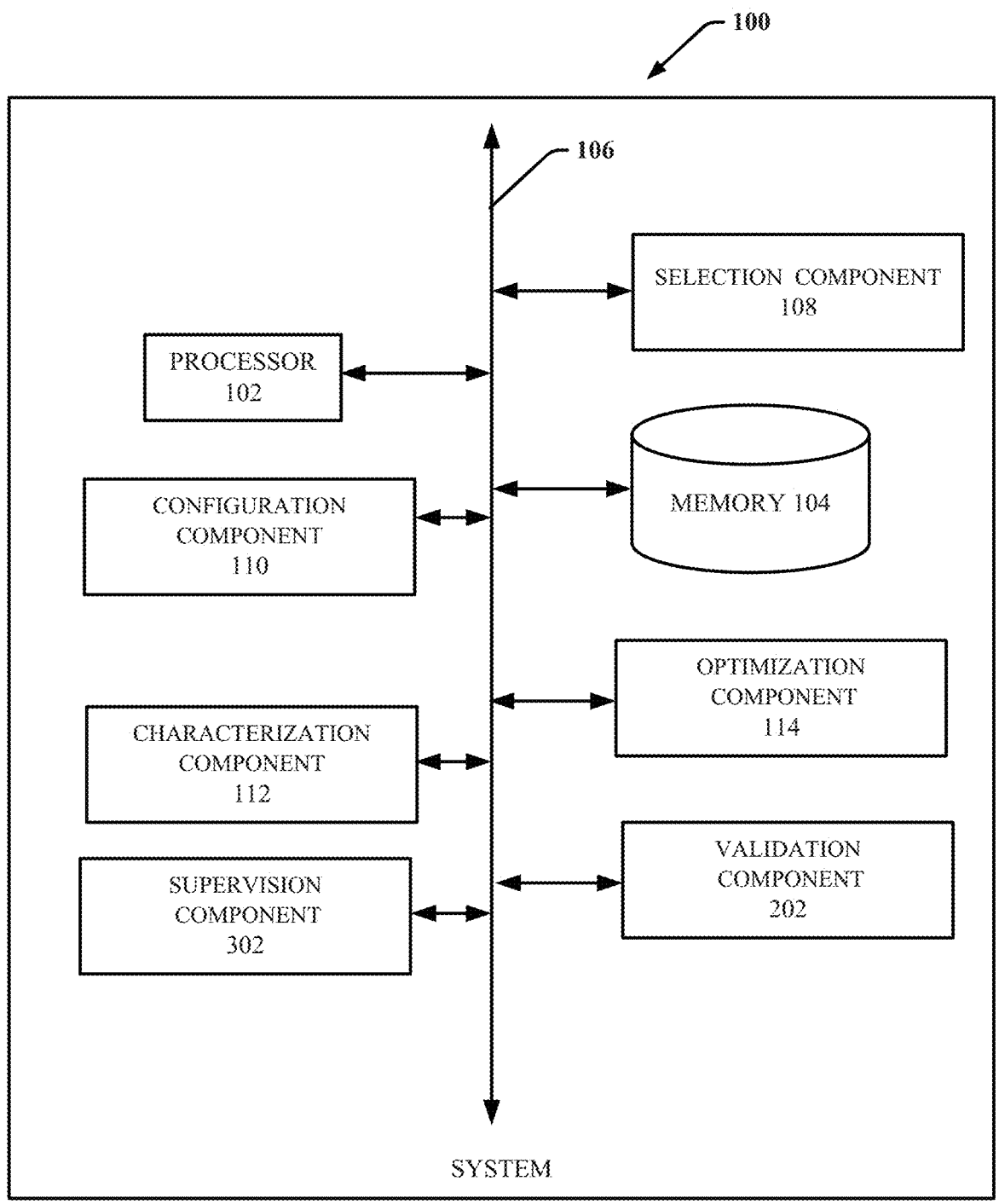
FIG. 3 illustrates a block diagram of an example system that can automatically configure a performance evaluation scheme and produce optimal model validation results using a supervising component in accordance with an implementation.

Turning to FIG. 2, during a configuration process of modifying performance evaluation scheme, a validation component 202 adapts a validation configuration decision to machine learning algorithms and adjusts ratio of size of training data set relative to size of a validation data set. Moreover, the validation component 202 can use a procedure for selecting Holdout size and a scheme to reduce variance in a generalization error estimate in Holdout validation via Bootstrapping. Along with adjusting ratio of size of training data by validation component 202, configuration component 110 as discussed previously can generate a set of samples of the ratio and an associated metric of performance evaluation accuracy. In this configuration process, system and method can also employ a supervision component 302 (FIG. 3) that evaluates a set of samples of the ratio. The supervision component 302 can use a subset of data points (x,y), where x is a performance evaluation configuration parameter which is a d percentage value and y is an estimate for corresponding evaluation accuracy level. Thus, supervising component 302 can identify a curve y=f(x) that fits a subset of data points (x,y) mentioned above.

Figure 4:
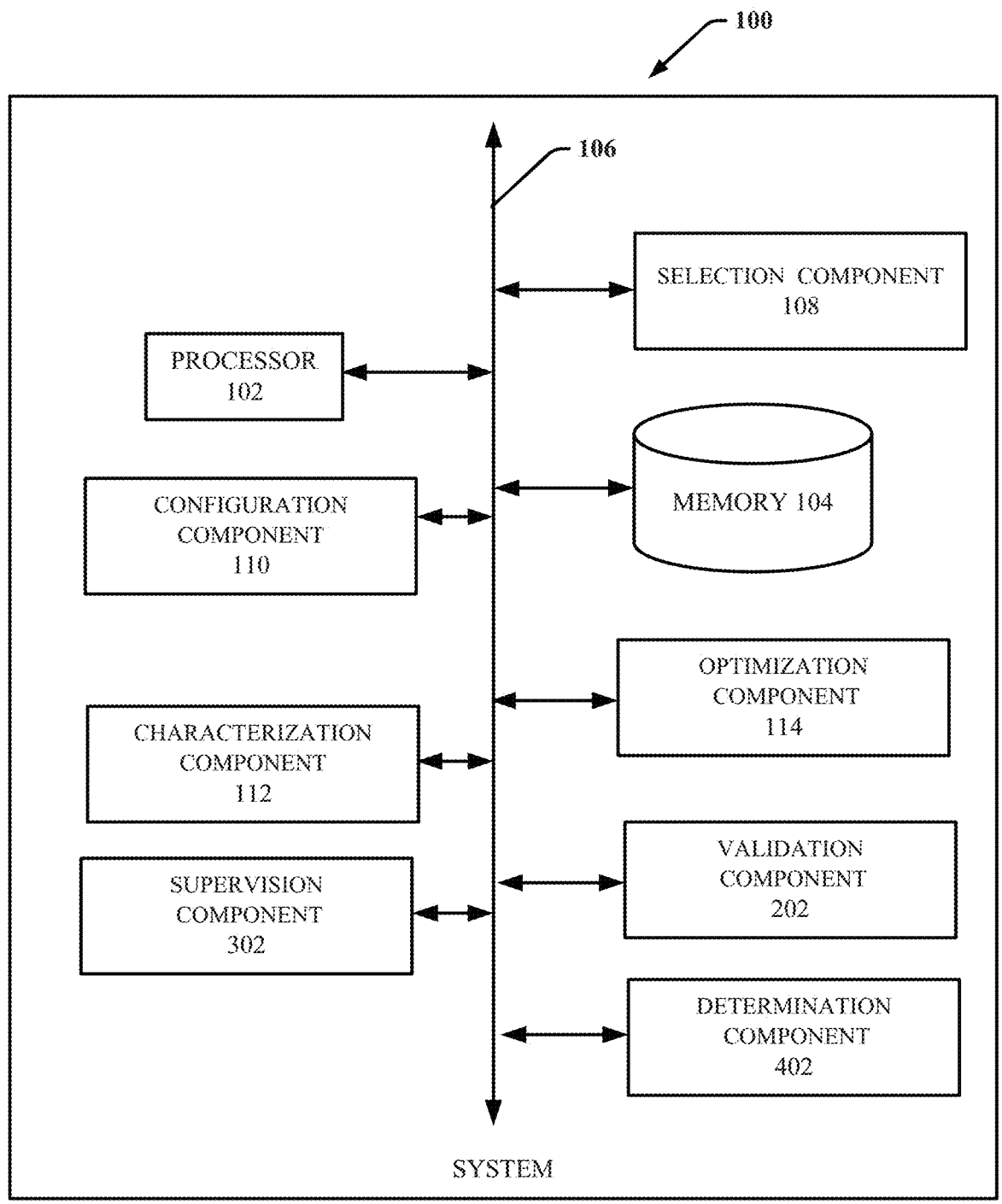
FIG. 4 illustrates a block diagram of an example system that can automatically configure a performance evaluation scheme and produce optimal model validation results using a determination component in accordance with an implementation.

In FIG. 4, a determination component 402 can determine configuration of machine learning algorithms or subset of machine learning algorithms. Moreover, determination component 402 can respectively determine use of the same or different configuration for a machine learning algorithm. A configuration of the evaluation scheme such as Holdout and k-fold are further discussed in sections below.

In order to further analyze these embodiments, Holdout validation can be formalized by bias variance tradeoff of a validation in a modern machine learning setting. It can be assumed that a boolean target function f, a mapping from feature space to $\{0, 1\}$. If $S_{tr}=\{(x_i, y_i), i=1, \ldots, N\}$ be a training data set, where $x_i$ is an arbitrary-dimensioned feature vector drawn IID (independent and identically distributed) from some distribution D and $y_i=f(y_i)\oplus a_i$, with $a_i\sim$Bernoulli(a). If $S_{pub}=\{(x_i, y_i), i=1, \ldots, m\}$ be a public test data set, where $x_i\sim D$, $y_i=f(x_i)\oplus b_i$, and $b_i\sim$Bernoulli($\beta$) with possibly $\beta\neq\alpha$. Also, a test data set can be denoted by $S_{pr}=\{(x_i, y_i), i=m+1, m+m+1 \ldots m+m0\}$, where again $x_i\sim D$, $y_i=f(x_i)\oplus c_i$, and $c_i\sim$Bernoulli($\gamma$) with $\gamma$ potentially not equal to $\alpha$ or $\beta$. The objective is to find a model h, also a mapping from a feature space to $\{0, 1\}$, that has a minimal possible expected error on a test data set, e.g., minimizing:

$$\epsilon^\gamma(h)=\epsilon_{f,D}^\gamma(h):=Pr_{x\sim D}[h(x)\neq f(x)\oplus c]$$

$$\epsilon^\gamma(h)=\epsilon_{f,D}^\gamma(h):=Pr_{x\sim D}[h(x)\neq f(x)\oplus c]$$

where $c\sim$Bernoulli($\gamma$). By definition, $$\epsilon^\gamma(h) = (1-\gamma)\epsilon(h) + \gamma(1-\epsilon(h))$$
$$= (1-2\gamma)\epsilon(h) + \gamma,$$

$$\epsilon^\gamma(h) = (1-\gamma)\epsilon(h) + \gamma(1-\epsilon(h))$$
$$= (1-2\gamma)\epsilon(h) + \gamma,$$

where $\in(h)$ denotes the generalization error defined as, $$\epsilon(h)=\epsilon_{f,D}(h):=Pr_{x\sim D}[h(x)\neq f(x)]$$

$$\epsilon(h)=\epsilon_{f,D}(h):=Pr_{x\sim D}[h(x)\neq f(x)]$$

Therefore, in these embodiments, there is an equivalent desire to identify a model that minimizes generalization error (arg mink $\in$(h)) using a (local) training data $S_{tr}$ and an ability to validate model performance on a (remote) public test data $S_{pub}$. Embodiments focus on developing a principled approach to model validation and selection. An accuracy in estimating a generalization error $\in$(h) and selecting a best model when exploring a substantial number of models is discussed in detail below.

Upon determining an amount of data to be used in a Holdout validation, Bootstrap method is applied. While the Bootstrap method has been used in many other different settings, its application in Holdout validation scheme is new in these embodiments. In theory, if $F^\wedge$ is denoted as an empirical distribution putting probability $1/zN$ on a member of a Holdout set $\{(X_i, Y_i), i=\sigma_1, \ldots, \sigma_{zN}\}$. Set $S^*$ is a Bootstrap sample if $S^*=\{(x^*_i, y^*_i), i=1, \ldots, zN\}$ with $(x^*_i, y^*_i)$ drawn from $F^\wedge$. It is proposed to generate a total of B such samples independently, say, $S^{*1}, S^{*2}, \ldots, S^{*B}$, and storing these samples for a validation calculation. More specifically, for fixed b=1, 2, . . . , B, it can be evaluated by:

$$\hat{\epsilon}^b_{D,f}(\hat{h}, z, N) = \frac{\sum_{i=1}^{zN} 1^b(\hat{h}(x^*_i) \neq y^*_i)}{zN}$$

$$\hat{\epsilon}^b_{D,f}(\hat{h}, z, N) = \frac{\sum_{i=1}^{zN} 1^b(\hat{h}(x^*_i) \neq y^*_i)}{zN}$$

where a superscript b means that calculation is done on $b^{th}$ Bootstrap sample. Then Bootstrap estimator for a generalization error is given by their arithmetic average:

$$\bar{\epsilon}_{B,D,f}(\hat{h}, z, N) = \frac{\sum_{b=1}^{B} \hat{\epsilon}^b_{D,f}(\hat{h}, z, N)}{B}$$

$$\bar{\epsilon}_{B,D,f}(\hat{h}, z, N) = \frac{\sum_{b=1}^{B} \hat{\epsilon}^b_{D,f}(\hat{h}, z, N)}{B}$$

Embodiments proposed an enhanced Bootstrap method such that if $\epsilon^-(\hat{h})$ is denoted as in-sample training error of model $\epsilon_{f,d}(h)$. Then, $\epsilon^-(\hat{h})$ is combined with Bootstrap estimator:

$$\bar{\epsilon}_{B,D,f}(\hat{h}, z, N)\bar{\epsilon}_{B,D,f}(\hat{h}, z, N)$$

to construct a less biased estimator. Specifically, if $w = 0.632/(1-0.368\hat{R})$, where:

$$\hat{R} := \frac{\bar{\epsilon}_{B,D,f}(\hat{h}, z, N) - \bar{\epsilon}(\hat{h})}{\hat{\epsilon}_I - \bar{\epsilon}(\hat{h})} \in [0, 1] \text{ and}$$

$$\hat{e}_I := \frac{\sum_{i=1}^{N}\sum_{j=1}^{N} 1(Y_i \neq \hat{h}(X_j))}{N^2}.$$

$$\hat{R} := \frac{\bar{\epsilon}_{B,D,f}(\hat{h}, z, N) - \bar{\epsilon}(\hat{h})}{\hat{\epsilon}_I - \bar{\epsilon}(\hat{h})} \in [0, 1] \text{ and}$$

$$\hat{\epsilon}_I := \frac{\sum_{i=1}^{N}\sum_{j=1}^{N} 1(Y_i \neq \hat{h}(X_j))}{N^2}.$$

Here, $\epsilon \hat{E}_I$ estimates so-called no-information error rate of model h" and response were independent. $\hat{R} \in [0, 1]$ can also be called as a relative overfitting rate. Thus, in these embodiments, an enhanced Bootstrap estimator can be denoted as:

$$\tilde{\epsilon}_{B,D,f}^+(\hat{h},z,N) = (1-w)\cdot\bar{\epsilon}(\hat{h}) + w\cdot\tilde{\epsilon}_{B,D,f}(\hat{h},z,N)$$

$$\tilde{\epsilon}_{B,D,f}^+(\hat{h},z,N) = (1-w)\cdot\bar{\epsilon}(\hat{h}) + w\cdot\tilde{\epsilon}_{B,D,f}(\hat{h},z,N)$$

In these embodiments, it has been discussed that dependence of bias-variance tradeoff of Holdout validation on Holdout size can empirically demonstrate the utility of a proposed characterization. While there are descriptive mathematical details for k-fold cross-validation using techniques developed for holdout validation, the techniques themselves for holdout validation are not discussed in this document. Bootstrapping based enhancements to a Holdout validation scheme can be incorporated. In this section, a proposed characterization can be used for an informed choice of k in k-fold Cross-Validation. While the focus was on a single Holdout validation scheme, an applicability of a proposed analysis (used to determine an algorithm instance specific z*) for a popular k-fold Cross-Validation scheme by providing an informed technique of choosing k is demonstrated. The error estimate $\epsilon^{\wedge CV}_{D,f}(g, k, N)$ for any algorithm instance g via k-fold Cross-Validation is given by:

$$\hat{\epsilon}^{CV}_{D,f}(g, k, N) = \frac{1}{k}\sum_{i=1}^{k} \hat{\epsilon}_{D,f}\left(\hat{h}_{i/k}, \frac{1}{k}, N\right)$$

$$\hat{\epsilon}^{CV}_{D,f}(g, k, N) = \frac{1}{k}\sum_{i=1}^{k} \hat{\epsilon}_{D,f}\left(\hat{h}_{i,k}, \frac{1}{k}, N\right)$$

where $\hat{h}_{i/k}$ is a model trained in an ith fold of k-folds with $(1-1/k)$ fraction of a training data, with $\epsilon^{\wedge}_{D,f}(\bullet)$ being evaluated on a 1/k fraction set held out. If $z = 1/k$ for any $k \in [2, \ldots, N]$, for any $i \in [1, \ldots, k]$, $$\frac{\hat{\epsilon}_{D,f}\left(\hat{h}_{i/k}, \frac{1}{k}, N\right)}{\hat{\epsilon}_{D,f}\left(h, \frac{1}{k}, N\right)} \approx \left[1 + \frac{C_1}{\sqrt{(1-1/k)N}}\right]$$

$$\frac{\hat{\epsilon}_{D,f}\left(\hat{h}_{i/k}, \frac{1}{k}, N\right)}{\hat{\epsilon}_{D,f}\left(h, \frac{1}{k}, N\right)} \approx \left[1 + \frac{C_1}{\sqrt{(1-1/k)N}}\right]$$

and thus by combining two equations above, it can be noted that:

$$\frac{\hat{\epsilon}^{CV}_{D,f}(g, k, N)}{\frac{1}{k}\sum_{i=1}^{k}\hat{\epsilon}_{D,f}\left(h, \frac{1}{k}, N\right)} = \frac{\sum_{i=1}^{k}\hat{\epsilon}_{D,f}\left(\hat{h}_{i/k}, \frac{1}{k}, N\right)}{\sum_{i=1}^{k}\hat{\epsilon}_{D,f}\left(h, \frac{1}{k}, N\right)}$$

$$\approx \left[1 + \frac{C_1}{\sqrt{(1-1/k)N}}\right]$$

$$\frac{1}{k}\sum_{i=1}^{k}\hat{\epsilon}_{D,f}\left(h, \frac{1}{k}, N\right) = \hat{\epsilon}_{D,f}(h, 1, N)$$

$$\approx \epsilon_{D,f}(h)\left[1 + \frac{C_0}{\sqrt{N}}\right]$$

$$\frac{\hat{\epsilon}^{CV}_{D,f}(g, k, N)}{\frac{1}{k}\sum_{i=1}^{k}\hat{\epsilon}_{D,f}\left(h, \frac{1}{k}, N\right)} = \frac{\sum_{i=1}^{k}\hat{\epsilon}_{D,f}\left(\hat{h}_{i/k}, \frac{1}{k}, N\right)}{\sum_{i=1}^{k}\hat{\epsilon}_{D,f}\left(h, \frac{1}{k}, N\right)}$$

$$\approx \left[1 + \frac{C_1}{\sqrt{(1-1/k)N}}\right]$$

$$\frac{1}{k}\sum_{i=1}^{k}\hat{\epsilon}_{D,f}\left(h, \frac{1}{k}, N\right) = \hat{\epsilon}_{D,f}(h, 1, N)$$

$$\approx \epsilon_{D,f}(h)\left[1 + \frac{C_0}{\sqrt{N}}\right]$$

By combining two equations above:

$$\frac{\hat{\epsilon}_{D,f}^{CV}(g, k, N)}{\epsilon_{D,f}(h)} = \left[1 + \frac{C_0}{\sqrt{N}}\right]\left[1 + \frac{C_1}{\sqrt{\left(1 - \frac{1}{k}\right)N}}\right]$$

$$\frac{\hat{\epsilon}_{D,f}^{CV}(g, k, N)}{\epsilon_{D,f}(h)} = \left[1 + \frac{C_0}{\sqrt{N}}\right]\left[1 + \frac{C_1}{\sqrt{\left(1 - \frac{1}{k}\right)N}}\right]$$

Similar to an estimation of z*, it can be estimated that k with best estimate of the true error by minimizing following quantity F(k) over k∈[2, ..., N]

$$F(k) = \left|\left[1 + \frac{C_0}{\sqrt{N}}\right]\left[1 + \frac{C_1}{\sqrt{(1 - 1/k)N}}\right] - 1\right|$$

$$F(k) = \left|\left[1 + \frac{C_0}{\sqrt{N}}\right]\left[1 + \frac{C_1}{\sqrt{(1 - 1/k)N}}\right] - 1\right|$$

for given $C_0$, $C_1$. Embodiments can be used for an informed choice of k for algorithm instance specific (estimated) values of $C_0$ and $C_1$ and find a smallest k (hence computationally least expensive) that approximates an estimation performance of leave-one-out-Cross-Validation (LOOCV) at a user-specified level. Formally, for a user-specified approximation factor δ>0, a computationally feasible k can be found by solving the following:

$$\min_{k \in [2, ..., N]} k \text{ such that } F(k) \le (1 + \delta)F(N)$$

$$\min_{k \in [2, ..., N]} k \text{ such that } F(k) \le (1 + \delta)F(N)$$

This scheme finds a lowest k that approximates LOOCV (up to a multiplicative factor) and since $C_0$, $C_1$ are algorithm instance specific, selected k would also be algorithm instance specific.

Characterization component 112, employs a supervised learning-based approach to characterize a relationship between performance evaluation scheme's configuration parameters and an evaluation accuracy and thus choose values of a configuration parameter to optimize such accuracy. To further describe a Holdout validation evaluation scheme, dependence of a bias-variance tradeoff of Holdout validation is characterized on Holdout size and empirically demonstrate the utility of a proposed characterization. Suppose z fraction of $S_{tr}$ are used to form a Holdout set where z ∈ (0, $z_{UB}$] and $z_{UB}$∈(0, 1) is pre-determined by other factors such as computational considerations. Embodiments determine a best such fraction, say z*, to enable accurate estimation of ∈(h). Suppose a model h results from applying an algorithm instance g to $S_{tr}$. An algorithm instance is a specific machine learning algorithm with a fixed choice of hyperparameters (for example, a tree ensemble with specified number of trees and tree depth). If same algorithm instance g generates h^ when applied to (1−z) fraction of $S_{tr}$, the difference between h and h^ should be increasing in z as this number, or more precisely zN, amounts to the difference in an actual training data set size in these two scenarios. Adopting terminology in the statistics literature, h^ is viewed as an estimator of h with its bias increasing in z. On the other hand, an empirical error of any model (including h, h^) on a Holdout set has a lower variance around its true generalization error for higher values of z as per Central Limit Theorem. An optimal z with regards to approximating ∈(h) balance this bias-variance trade-off. More formally, if {σ1, ..., σN} be a random permutation of indices {1, ..., N}, in which {$\sigma_1$, ..., $\sigma_{zN}$} be indices for a Holdout data point and remaining indices {$\sigma_{zN+1}$, ..., $\sigma_N$} correspond to a data (sub)set to which an algorithm instance g is applied resulting in h^. The validation error of model h^ on the Holdout given by:

$$\hat{\epsilon}_{D,f}(\hat{h}, z, N) = \frac{\sum_{i=1}^{zN} 1(\hat{h}(X_{\sigma_i}) \ne Y_{\sigma_i})}{zN} \quad A$$

$$\hat{\epsilon}_{D,f}(\hat{h}, z, N) = \frac{\sum_{i=1}^{zN} 1(\hat{h}(X_{\sigma_i}) \ne Y_{\sigma_i})}{zN}$$

Holdout validation method suggests estimating generalization error of h, namely $\epsilon_{f,D}(h)$, by $\hat{\epsilon}_{D,f}(\hat{h}, z, N)$. A main idea is to use supervised learning to characterize ratio between this estimator and these estimates as a function of z and then choose z value to minimize absolute value of that function. More specifically, this estimator $\hat{\epsilon}_{D,f}(\hat{h}, z, N)$ has two major sources of inaccuracy, the fact that it is evaluated on an empirical set of finite size rather than over the true distribution D (e.g., the variance component) and model difference between h^ and h (e.g., the bias component). It is to be noted that z* is chosen to minimize an aggregate effect from these two sources. First, it follows from a central limit theorem that:

$$\hat{\epsilon}_{D,f}(h, z, N) \approx \epsilon_{f,D}(h)\left[1 + \frac{C_0}{\sqrt{zN}}\right]$$

$$\hat{\epsilon}_{D,f}(h, z, N) \approx \epsilon_{f,D}(h)\left[1 + \frac{C_0}{\sqrt{zN}}\right]$$

for some constant $C_0$. Thus, by noting two formulas listed above, Embodiments propose characterizing a functional relationship between $\hat{\epsilon}_{D,f}(\hat{h}, z, N)/\hat{\epsilon}_{D,f}(h, z, N)$ and z via a supervised learning approach. Since this function is expected to be continuous in z, following a square-root order present in a central limit approximation above, it can be assumed that the following parametric form:

$$\frac{\hat{\epsilon}_{D,f}(\hat{h}, z, N)}{\hat{\epsilon}_{D,f}(h, z, N)} \approx 1 + P\left(\frac{1}{\sqrt{(1 - z)N}}\right)$$

$$\frac{\hat{\epsilon}_{D,f}(\hat{h}, z, N)}{\hat{\epsilon}_{D,f}(h, z, N)} \approx 1 + P\left(\frac{1}{\sqrt{(1 - z)N}}\right)$$

where P(x) denotes a polynomial of x and it can fit an expression by polynomial regression. The hypothesis that a proper choice of a basis function for a polynomial, or a proper choice of a model other than a polynomial-form expression, very much depends on what model instance or set of model instances or more essentially characteristics of a specific algorithm(s) and data set under study. Similarly, Embodiments suggest estimating constant $C_0$ by linear regression. In that expression, $\epsilon_{f,D}(h)$ is unknown and hence are approximated. It is recommended to use $\hat{\epsilon}_{D,f}(\hat{h}, z, N)$, which admittedly suffers from some bias and yet it can be seen that from numerical experiments to be adequate for the purpose of estimating $C_0$. Combining two equations above, it can be noted that:

$$\hat{\epsilon}_{D,f}(\hat{h}, z, N) \approx \epsilon_{f,D}(h) \cdot \left[1 + \frac{C_0}{\sqrt{zN}}\right] \cdot [1 + P([(1-z)N]^{-1/2})]$$

$$\hat{\epsilon}_{D,f}(\hat{h}, z, N) \approx \epsilon_{f,D}(h) \cdot \left[1 + \frac{C_0}{\sqrt{zN}}\right] \cdot [1 + P([(1-z)N]^{-1/2})]$$

where on the right-hand side is the second and third terms that can be characterized by experimenting different z values and (or) different models and fitting two regressions. In particular, one practically appealing approach is to fit up to a first order; e.g., substituting $$P([(1-z)N]^{-1/2}) = \frac{C_1}{\sqrt{(1-z)N}} + o\left(\frac{1}{N}\right)$$

$$P([(1-z)N]^{-1/2}) = \frac{C_1}{\sqrt{(1-z)N}} + o\left(\frac{1}{N}\right)$$

into the equation below:

$$\hat{\epsilon}_{D,f}(\hat{h}, z, N) \approx \epsilon_{f,D}(h) \cdot \left[1 + \frac{C_0}{\sqrt{zN}}\right] \cdot [1 + P([(1-z)N]^{-1/2})]$$

$$\hat{\epsilon}_{D,f}(\hat{h}, z, N) \approx \epsilon_{f,D}(h) \cdot \left[1 + \frac{C_0}{\sqrt{zN}}\right] \cdot [1 + P([(1-z)N]^{-1/2})]$$

and hence having that, $$\frac{\hat{\epsilon}_{D,f}(\hat{h}, z, N)}{\epsilon_{f,D}(h)} \approx \left[1 + \frac{C_0}{\sqrt{zN}}\right] \cdot \left[1 + \frac{C_1}{\sqrt{(1-z)N}}\right]$$

$$\frac{\hat{\epsilon}_{D,f}(\hat{h}, z, N)}{\epsilon_{f,D}(h)} \approx \left[1 + \frac{C_0}{\sqrt{zN}}\right] \cdot \left[1 + \frac{C_1}{\sqrt{(1-z)N}}\right]$$

where two constants $C_0$ and $C_1$ are to be fit from two linear regressions on data collected from experimenting model(s) of interest on a data set in hand. Once $C_0$ and $C_1$ are determined, in order to minimize an estimation error of $\hat{\epsilon}_{D,f}(\hat{h}, z, N)$ caused by bias and variance, a one-dimensional search of $z^*$ on $(0, z_{uB}]$ can be done, e.g., by binary search, to minimize:

$$\left|\left[1 + \frac{C_0}{\sqrt{zN}}\right] \cdot \left[1 + \frac{C_1}{\sqrt{(1-z)N}}\right] - 1\right|$$

$$\left|\left[1 + \frac{C_0}{\sqrt{zN}}\right] \cdot \left[1 + \frac{C_1}{\sqrt{(1-z)N}}\right] - 1\right|$$

It can be noted that this approximate approach can lead to practical benefits in both generalization (testing) error estimation accuracy and a model selection performance.

Optimization component 114, optimizes accuracy of a machine learning algorithm as a function of size of training data set relative to size of validation data set through selection of values associated with configuration parameters. In the current state of the art, machine learning methods have different configurations and in order to measure the performance of any particular configuration, various evaluation schemes such as Holdout validation or k-fold is used. Most machine learning method has hyper parameters to be set that may significantly impact an algorithm in various techniques (It is useful to optimize values of hyper parameters to produce best results). The quality of results obtained from trained machine learning method can depend on the size of a data set. Substantial data set can lead to greater opportunity to produce optimized results. In order to evaluate a true error of this trained method, a set of unseen data is set aside such that it can be used to evaluate a trained method and thus be able to analyze accuracy of results. A trade off here is that if a larger fraction of data is used for training, then optimized results can be achieved for individual models. However, if smaller training data is used for evaluation then a smaller number of errors are obtained which is used to compare different models. Hence, these embodiments primarily focus to have a fair trade between training and evaluation data set to obtain optimal results. Thus, optimization component 114, optimizes f(x) function mentioned above in section 19, where f(x) is a ratio of discrepancy and minimizes f(x) when proposed as a configuration parameter value.

Figure 5:
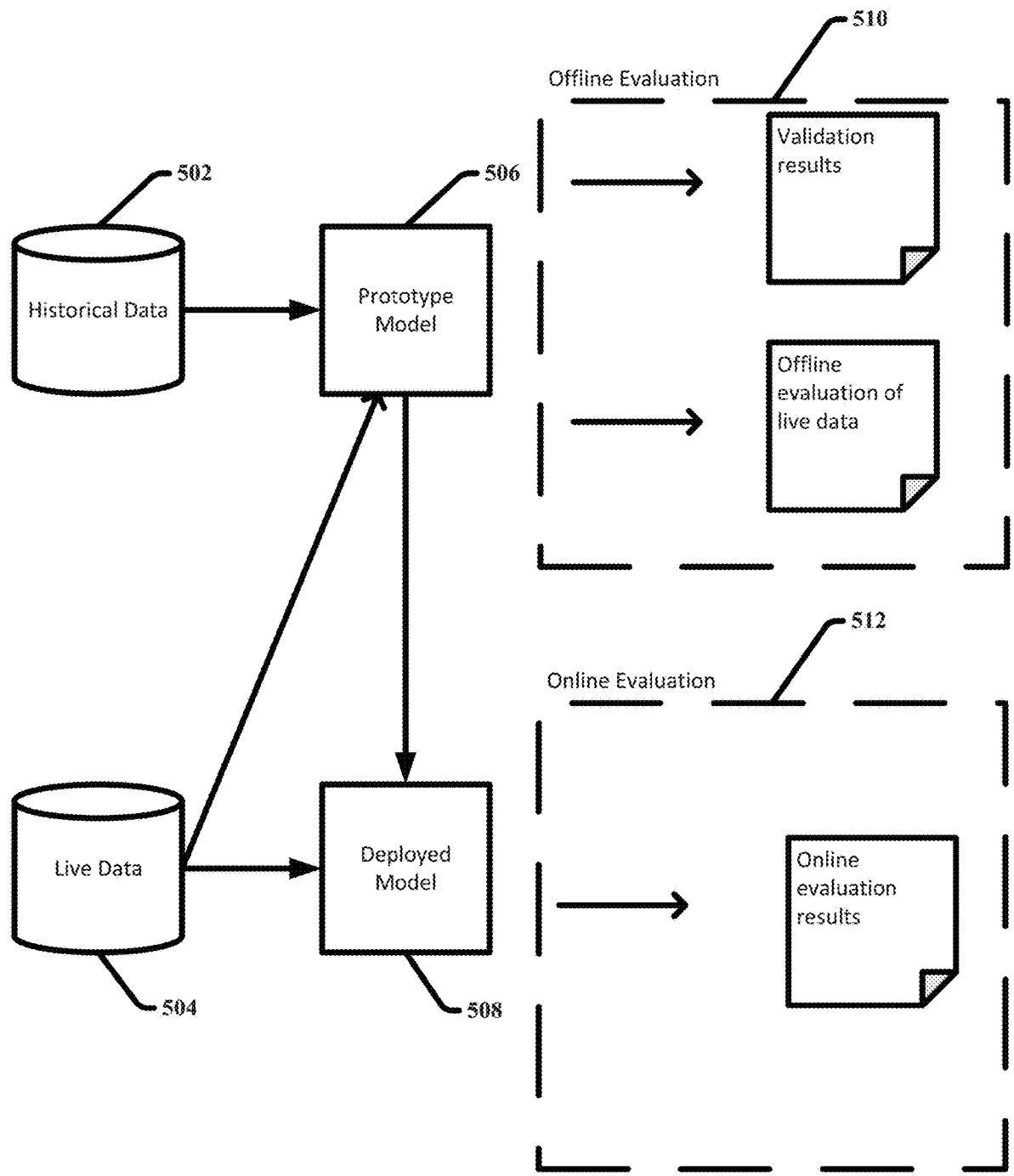
FIG. 5 illustrates an example of a machine learning model development and evaluation workflow in accordance with an implementation.

FIG. 5 illustrates an example of a machine learning model development and evaluation workflow. The first stage involves prototyping block 506, where models are analyzed to find a best one (model selection). Once, a model is chosen for a prototype model, then it can be deployed into production, where it can go through further testing with live data. The workflow of this algorithm can be discussed in terms of online evaluation depicted as block 512 and offline evaluation depicted as block 510. Online evaluation measures live metrics of a deployed model depicted as block 508. Deployed model block 508 can receive live data fed into its system as depicted in block 504. Offline evaluation process measures offline metrics of a prototyped model as shown in block 506. Prototyped model block 506 receives historical data as depicted in block 502 and sometimes live data as well. The complexity of these measures varies depending on metrics used for accuracy or precision-recall for offline evaluation and measure business metrics which may not be available on historical data for online evaluation. Moreover, the two sources of data (historical and live) assume that distribution of data stays the same over time; however, distribution of data changes over time. Hence it is useful to be able to capture distribution drift and adapt to a corresponding model. Thus, it is significant to have proper validation metric(s) to detect distribution drift as well. A main task in a prototyping phase 506 is to select a model that best fits given data. A fair model evaluation would be to measure the model's performance on data that it hasn't yet seen. This provides an estimate of a generalization error, which measures how a model generalizes to new data. One way to generate new data is to hold out part of a training set and use it for evaluation—this is known as hold-out validation. There are other general methods to simulate new data known as k-fold Cross-Validation, Bootstrapping or jackknife resampling.

One purpose of Holdout evaluation mechanism is to test a model on different data than it was trained on. Through this technique, it provides an unbiased estimate of learning performance. In Holdout validation method, data set is randomly divided into two subsets namely training set and validation set. A training set is used as a subset of dataset to build predictive models and validation set also uses a subset of dataset to assess the performance of a model built during a training phase. This approach is useful for its speed, simplicity and flexibility. A weakness of this method is to have high variability during estimation of accuracy due to differences in training and test data set. Holdout validation method is particularly appealing in automated machine learning systems as such systems oftentimes explore a number of families of algorithms on parallel computers, and thus using an efficient validation scheme like Holdout method is essential. It is also useful for some practical settings where multiple data scientists with expertise on different statistical techniques work in parallel to investigate their performance. Also, a simple Holdout method does not rule out the possibility that on an actual 'train' data subset, a modeler can still perform cross validation or other validation methods, e.g., three-way Holdout method. As is the case with many modern machine learning algorithms and their popular packages when conducting hyperparameter optimization, the hold-out validation method works on fully independent data and has lower computational costs as it is required to be run once. However, the performance of this validation method is subject to vary with smaller size of data.

A Holdout validation method can be very useful for a fixed set of data points. This method is the simplest kind of Cross-Validation in which a data set is separated into two sets as mentioned in section above. The k-fold Cross-Validation is one way to improve over Holdout method wherein data set is divided into k subsets and Holdout method is repeated k times. Cross-Validation method involves a partition of original observation dataset into a training set which is used to train a model and also an independent set which is used to evaluate the analysis. A common Cross-Validation technique is known as k-fold Cross-Validation. In a k-fold Cross-Validation, an original dataset is partitioned into k equal size subsamples called folds. The k value can depend on any value a user input. When one k subset is used as a validation set then the other k−1 subsets are used to form a training set.

Error estimation is averaged through all k trials (subsets) in order to obtain total effectiveness of a specific model. The Cross-Validation is useful when a training dataset is small such that it can't segregate part of a data just for validation. Cross-Validation method is mainly used in machine learning applications in order to learn to estimate the skill of a machine learning model on unseen data. This is a very well-known method as it is simple to understand, and results are less biased than other methods. Bootstrap (resampling technique) is closely related to Cross-Validation; it was inspired by another resampling technique called Jackknife wherein data is resampled without replacement; e.g., once a data set is selected then it cannot be selected again for a different run. However, Bootstrap is focused on resampling data with replacement of data sets. Given a dataset that contains data points, this method can pick a data point uniformly at random, add to the Bootstrap set and can put the data point back into the data set and thus continue to repeat the same process.

A Bootstrap method is a resampling technique wherein it is a process of repeatedly drawing samples from a data set and then refit into a given model on samples in order to obtain an accurate model. The basic idea of Bootstrap is to estimate (such as sample mean) for a population parameter (such as population mean) on sample data. It is a resampling method by independently sampling with replacement from an existing sample data with same sample size and thus performing inference among these resampled data. There are multiple datasets that are generated by sampling from an original dataset and new datasets that can be used to estimate a quantity of interest. Bootstrap can generate multiple datasets and hence multiple estimates which can help to calculate variance for an estimate. Given a dataset that has N data points, Bootstrap selects a data point uniformly at random, adds data points to a Bootstrapped set and then place data points back into a data set. This ultimately generates an empirical distribution of data and thus Bootstrap method simulates new samples by drawing from an empirical distribution.

Figure 6:
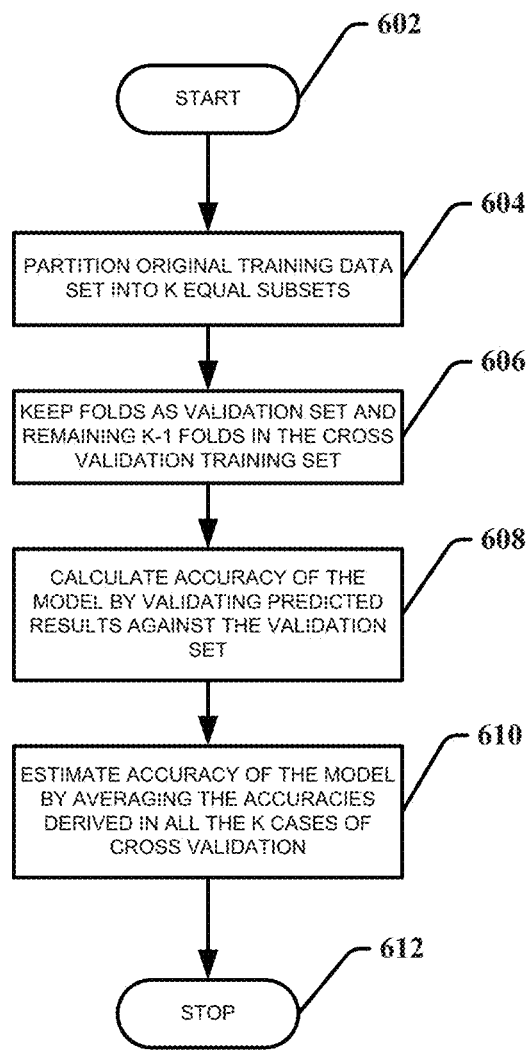
FIG. 6 illustrates a flowchart for K-fold cross validation through a series of logical steps in accordance with an implementation.

FIG. 6. illustrates a flowchart for k-fold cross validation through a series of logical steps. Firstly, an original training data set is partitioned into k equal subsets at 604. A subset is called a fold and can be named as f1, f2, ..., fk. For i=1 to i=k, if fi is a validation set and then remaining k−1 folds is kept in the Cross-Validation training set block 606. Then, machine learning model is trained using a Cross-Validation training set and the accuracy of the model is calculated by validating predicted results against a validation set as shown at block 608. At last, an accuracy of a machine learning model is estimated by averaging accuracies derived in all k cases of Cross-Validation at block 610. An original training data set is used for training as well as validation and entry are used once for validation. A significant advantage of a Cross-Validation method is that it matters less how data is divided. Every data point is in a test set once, and is in a training set k−1 time. In many scenarios, the Cross-Validation method is preferred to be used as it provides an opportunity to train on multiple train-test splits. Through this technique, better judgement can be made in terms of a performance of a model on unseen data.

Figure 7:
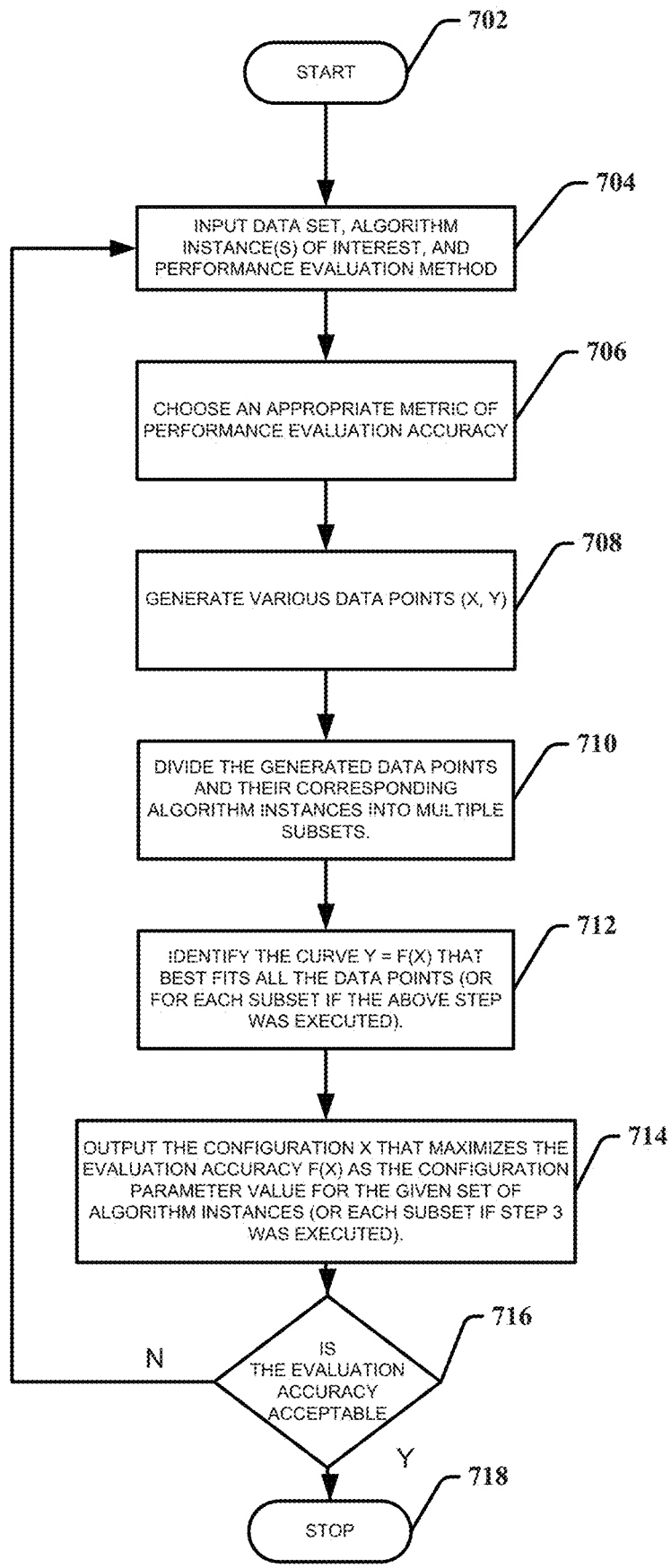
FIG. 7 illustrates a flow chart of embodiments for automatically configuring performance evaluation schemes for machine learning algorithms in accordance with an implementation.

FIG. 7 depicts operation of automatically configuring performance evaluation schemes and characterizing accuracy of schemes thus allowing to determine a configuration with highest accuracy. An automated machine learning system should possess a procedure that mathematically guides choice of model validation and selection. Automated systems usually evaluate many candidate algorithms and hyperparameters in absence of domain knowledge that might be available to a data scientist. Consequently, an effective validation and selection strategy becomes significant. Embodiments present a first mathematical formulation of a learning issue to have access to a test-data-based aggregate scoring oracle (in addition to the training set) with a goal to develop optimal model validation and selection schemes over substantial sets of models. This methodology begins by inputting a data set which are algorithm instances of interest and performance evaluation method as depicted at block 704. Then an appropriate metric of performance evaluation accuracy is chosen as shown at block 706. Moreover, at block 708, data points (x,y) are generated, where x is a performance evaluation configuration parameter and y is an estimate for corresponding evaluation accuracy level. These data points are generated by empirically evaluating different performance evaluation configurations and/or different algorithm instances of interest on the same data set. If there are multiple data sets then these embodiments divide generated data points and their corresponding algorithm instances into multiple subsets as shown at block 710. Through these data sets, these embodiments identify a curve y=f(x) as depicted at block 712 that best fits the data points (or for a subset if block 710 was executed). Upon identifying a curve, output configuration x that maximizes evaluation accuracy f(x) as a configuration parameter value for the given set of algorithm instances (or a subset if block 710 was executed) as shown at block 714. At 716 a determination is made regarding whether the evaluation accuracy is acceptable. If No, the process returns to 704, and if Yes, the process ends at 718.

Figure 8:
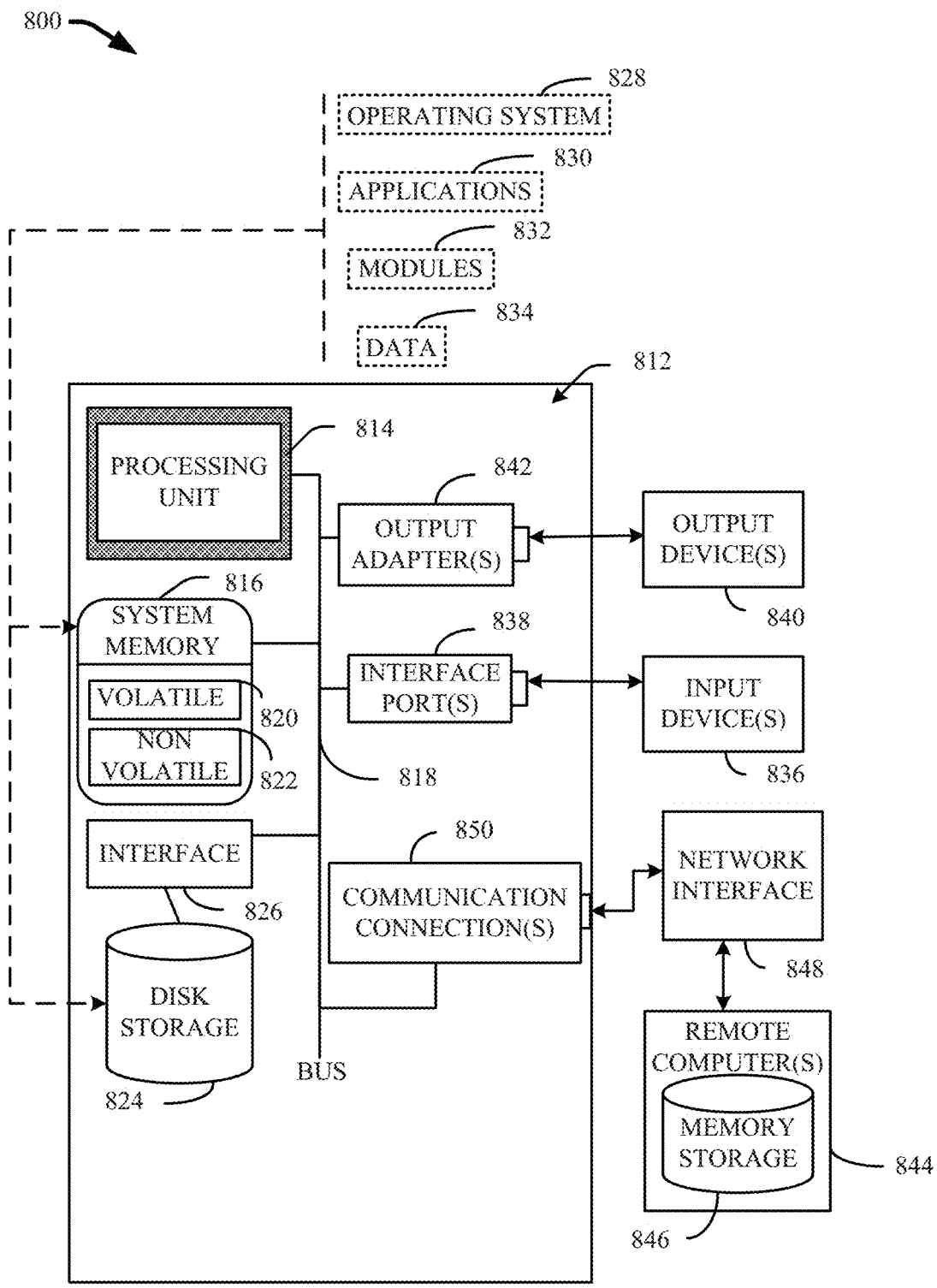
FIG. 8 illustrates a schematic diagram of an example operating environment in accordance with one or more implementations described herein.

In FIG. 8 it illustrates a suitable operating environment 800 for implementing various aspects of this disclosure can also include a computer 812. The computer 812 can also include a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814. The system bus 818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1094), and Small Computer Systems Interface (SCSI). The system memory 816 can also include volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable programmable ROM (EEPROM), flash memory, or nonvolatile random-access memory (RAM) (e.g., ferroelectric RAM (FeRAM). Volatile memory 820 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 812 can also include removable/non-removable, volatile/non-volatile computer storage media. FIG. 8 illustrates, for example, a disk storage 824. Disk storage 824 can also include, but is not limited to, devices like a magnetic disk drive, floppy disk drive, tape drive, Jaz drive, Zip drive, LS-100 drive, flash memory card, or memory stick. The disk storage 824 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 824 to the system bus 818, a removable or non-removable interface is typically used, such as interface 826. FIG. 8 also depicts software that acts as an intermediary between users and the basic computer resources described in the suitable operating environment 800. Such software can also include, for example, an operating system 828. Operating system 828, which can be stored on disk storage 824, acts to control and allocate resources of the computer 812. System applications 830 take advantage of the management of resources by operating system 828 through program modules 832 and program data 834, e.g., stored either in system memory 816 or on disk storage 824. It is to be appreciated that this disclosure can be implemented with various operating systems or combinations of operating systems. A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port can be used to provide input to computer 812, and to output information from computer 812 to an output device 840. Output adapter 842 is provided to illustrate that there are some output devices 840 like monitors, speakers, and printers, among other output devices 840, which require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a computer, a server, a router, a network PC, a workstation, a microprocessor-based appliance, a peer device or other common network node and the like, and typically can also include many or all the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 850 refers to the hardware/software employed to connect the network interface 848 to the system bus 818. While communication connection 850 is shown for illustrative clarity inside computer 812, it can also be external to computer 812. The hardware/software for connection to the network interface 848 can also include, for exemplary purposes only, internal and external technologies such as, modems including regular telephone grade modems, cable modems and DSL modems, ISDN adapters, and Ethernet cards.

Embodiments of the present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in one or more computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, to perform aspects of the present invention.

Aspects of the present invention are described herein with reference to flowchart illustrations and/or block diagrams of methods, apparatus (systems), and computer program products according to embodiments of the invention. It can be understood that one or more blocks of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, one or more blocks in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It can also be noted that one or more block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art can recognize that this disclosure also can or can be implemented in combination with other program modules. Generally, program modules include routines, programs, components, data structures, etc. that perform particular tasks and/or implement abstract data types. Moreover, those skilled in the art can appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a server computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random-access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DR-RAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems, computer program products, and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations can be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer executable components; and
a processor that executes the computer executable components stored in the memory;
wherein the computer executable components comprise:
a selection component that selects a metric of performance evaluation accuracy;
a configuration component that configures a performance evaluation scheme for a set of machine learning algorithms, wherein the configuration component:
generates a set of data points for a set of performance evaluation schemes based on results of employment of the set of performance evaluation schemes on the set of machine learning models, wherein each data point comprises:
a respective performance evaluation configuration parameter for a corresponding performance evaluation scheme of the set of performance evaluation schemes, and
a value for the metric of performance evaluation accuracy of the corresponding performance evaluation scheme using the respective performance evaluation configuration parameter;
identifies a first function that best fits the set of data points; and
selects, from the set of performance evaluation schemes, the corresponding performance evaluation scheme and the respective performance evaluation configuration parameter for the corresponding performance evaluation scheme that maximizes the first function as a configuration of the performance evaluation scheme for the set of machine learning algorithms;
a characterization component that employs a supervised learning-based approach to characterize a relationship between the configuration of the performance evaluation scheme and fidelity of performance estimates; and
an optimization component that optimizes accuracy of the set of machine learning algorithms as a second function of a size of a training data set relative to a size of a validation data set through selection of values associated with configuration parameters of the set of machine learning algorithms.

2. The system of claim 1, further comprising a validation component that adapts a validation configuration decision to the set of machine learning algorithms and adjusts ratio of the size of the training data set relative to the size of the validation data set.

3. The system of claim 1, further comprising a determination component that respectively determines use of same or different configuration for the set of machine learning algorithms.

4. The system of claim 1, further comprising a determination component that determines configuration for each machine learning algorithm or subset of the set of machine learning algorithms.

5. The system of claim 2, wherein the configuration component generates a set of samples of the ratio and the metric of performance evaluation accuracy.

6. The system of claim 5, further comprising a supervision component that evaluates the set of samples of the ratio.

7. The system of claim 6, wherein the supervision component uses a subset of the set of data points.

8. The system of claim 2, wherein the validation component uses a procedure for selecting a holdout size and a scheme to reduce variance in a generalization error estimate in holdout validation via bootstrapping.

9. A computer implemented method, comprising:
selecting, by a processor operatively coupled to a memory, a metric of performance evaluation accuracy;
configuring, by the processor, a performance evaluation scheme for a set of machine learning algorithms, wherein the configuring the performance evaluation scheme comprises:
generating a set of data points for a set of performance evaluation schemes based on results of employment of the set of performance evaluation schemes on the set of machine learning models, wherein each data point comprises:
a respective performance evaluation configuration parameter for a corresponding performance evaluation scheme of the a set of performance evaluation schemes, and
a value for the metric of performance evaluation accuracy of the corresponding performance evaluation scheme using the respective performance evaluation configuration parameter;
identifying a first function that best fits the set of data points; and
selecting, from the set of performance evaluation schemes, the corresponding performance evaluation scheme and the respective performance evaluation configuration parameter for the corresponding performance evaluation scheme that maximizes the first function as a configuration of the performance evaluation scheme for the set of machine learning algorithms;
characterizing, by the processor using a supervised learning-based approach, a relationship between the configuration of the performance evaluation scheme and fidelity of performance estimates; and
optimizing, by the processor, accuracy of the set of machine learning algorithms as a second function of a size of a training data set relative to a size of a validation data set through selection of values associated with configuration parameters of the set of machine learning algorithms.

10. The method of claim 9, further comprising adapting, by the processor, a validation configuration decision to the set of machine learning algorithms and adjusting ratio of the size of the training data set relative to the size of the validation data set.

11. The method of claim 9, further comprising determining, by the processor, use of same or different configuration for the set of machine learning algorithms.

12. The method of claim 9, further comprising determining, by the processor, configuration for each machine learning algorithm or subset of the set of machine learning algorithms.

13. The method of claim 10, further comprising generating, by the processor, a set of samples of the ratio and the metric of performance evaluation accuracy.

14. The method of claim 13, further comprising evaluating, by the processor, the set of samples of the ratio.

15. The method of claim 14, wherein the processor uses a subset of the set of data points.

16. The method of claim 9, selecting, by the processor, a holdout size and a scheme to reduce variance in a generalization error estimate in holdout validation via bootstrapping.

17. A computer program product comprising a computer readable storage medium having program instructions embodied therewith, the program instructions executable by a processor to cause the processor to:
- select a metric of performance evaluation accuracy;
- configure a performance evaluation scheme for a set of machine learning algorithms, wherein the configuring the performance evaluation scheme comprises:
  - generating a set of data points for a set of performance evaluation schemes based on results of employment of the set of performance evaluation schemes on the set of machine learning models, wherein each data point comprises:
    - a respective performance evaluation configuration parameter for a corresponding performance evaluation scheme of the set of performance evaluation schemes, and
    - a value for the metric of performance evaluation accuracy of the corresponding performance evaluation scheme using the respective performance evaluation configuration parameter;
  - identifying a first function that best fits the set of data points; and
  - selecting, from the set of performance evaluation schemes, the corresponding performance evaluation scheme and the respective performance evaluation configuration parameter for the corresponding performance evaluation scheme that maximizes the first function as a configuration of the performance evaluation scheme for the set of machine learning algorithms;
- characterize, using supervised learning-based approach, a relationship between configuration of the performance evaluation scheme and fidelity of performance estimates;
- optimize accuracy of the set of machine learning algorithms as a second function of a size of a training data set relative to a size of a validation data set through selection of values associated with configuration parameters of the set of machine learning algorithms.

18. The computer program product of claim 17, wherein the program instructions are further executable by the processor to cause the processor to adapt a validation configuration decision to the set of machine learning algorithms and adjusting ratio of the size of the training data set relative to the size of the validation data set.

19. The computer program product of claim 17, wherein the program instructions are further executable by the processor to cause the processor to determine use of same or different configuration for the set of machine learning algorithms.

20. The computer program product of claim 17, wherein the program instructions are further executable by the processor to cause the processor to determine configuration for each machine learning algorithm or subset of the set of machine learning algorithms.

* * * * *